United States Patent [19]

Grosso et al.

[11] 3,962,484

[45] June 8, 1976

[54] METHOD FOR PREPARING LIQUID FEED SUPPLEMENTS CONTAINING CALCIUM CHLORIDE

[75] Inventors: Silvano Grosso; Kenneth E. Nelson, both of Midland, Mich.

[73] Assignee: The Dow Chemical Company, Midland, Mich.

[22] Filed: June 3, 1974

[21] Appl. No.: 475,367

[52] U.S. Cl. .............................. 426/658; 426/69; 426/74; 426/807
[51] Int. Cl.² .......................................... A23K 1/22
[58] Field of Search .............. 426/69, 74, 213, 380, 426/658, 807; 71/28

[56] References Cited
UNITED STATES PATENTS
3,523,798  8/1970  Kail..................................... 426/213
3,753,723  8/1973  Henderson et al................ 426/69 X

*Primary Examiner*—Raymond N. Jones
*Assistant Examiner*—R. A. Yoncoskie
*Attorney, Agent, or Firm*—Gary D. Street; Edward E. Schilling

[57] ABSTRACT

Liquid animal feed supplements comprising water, soluble carbohydrate sources, at least one soluble elemental source selected from the group consisting of phosphorous and sulfur, and calcium chloride are prepared by first incorporating said elemental source with said carbohydrate source and water and thereafter incorporating into said resulting mixture the calcium chloride. By such method, gelling of the liquid feed supplement and/or sedimentation of insoluble materials therefrom are avoided and a stable, fluid liquid feed supplement obtained.

6 Claims, No Drawings

METHOD FOR PREPARING LIQUID FEED SUPPLEMENTS CONTAINING CALCIUM CHLORIDE

BACKGROUND OF THE INVENTION

The present invention relates to a method of adding calcium, in the form of calcium chloride, to liquid feed supplements for animals, particularly ruminant animals.

Unlike soluble elemental sources such as phosphorous and sulfur, calcium is generally not incorporated into liquid feed supplements. Calcium carbonate, which is generally employed in dry feed supplements is not desirable for liquid feed supplements in view of its relative insolubility. Moreover, phosphoric acid or phosphorous salts tend to react with soluble calcium compounds, forming insoluble precipitates. This is highly undesirable for liquid feed supplements where all ingredients are preferably maintained in solution. According to the method of Kail (U.S. Pat. No. 3,523,798), calcium chloride is incorporated into such liquid feed supplements by first preparing a water solution of urea and calcium chloride, which is subsequently mixed with feed supplement bases, such as molasses and the like, which contain phosphorous and sulfur sources. However, soluble calcium compounds have not proven feasible for direct incorporation into liquid feed supplements or into liquid feed supplements containing non-protein nitrogen sources such as, for example, urea and the like, because of gelling and sedimentation problems.

GENERAL SUMMARY

According to the present invention, stable, fluid, liquid feed supplements comprising water, soluble carbohydrate sources, at least one soluble elemental source selected from the group consisting of phosphorous and sulfur, and calcium chloride are obtained by the method comprising steps of A) first mixing said soluble elemental source with said carbohydrate source and water, B) thereafter incorporating said calcium chloride into the mixture of step A. Calcium is an essential nutrient for animals and the method of the present invention provides for the incorporation of a soluble form of calcium, i.e., calcium chloride, and obviates the problems of excess thickening and/or gelling and sedimentation usually encountered with the direct addition of calcium chloride to liquid feed supplements containing phosphorous and/or sulfur sources.

DETAILED DESCRIPTION OF THE INVENTION

The water soluble carbohydrate source for use in the liquid feed supplements of this invention is preferably molasses but other liquid or water soluble carbohydrate sources can be used, as is known in the feed supplement art. Molasses is particularly advantageous because of its low cost and availability, but other soluble high carbohydrate material can be used, such as condensed distiller solubles, condensed corn steep water solubles, condensed fish solubles, sugar solutions such as dextrose and the like, etc. The molasses can be any commercial molasses product such as those obtained as by-products of the processing of sugar beets, sugar cane, corn (Hydrol), or wood. The calcium content of beet molasses varies with the source of supply and those having a high calcium content may cause gelling of liquid feed supplements where uncontrolled amounts of calcium chloride are employed. Therefore, the calcium content of beet molasses in particular should be considered where large amounts of calcium chloride are to be added to the supplement. Ordinarily, molasses is not completely dried but is produced and shipped as a concentrated water solution which is well adapted for use in the present invention. It will be understood that the water content of the molasses base, as well as other ingredients added in aqueous solution, should be considered in determining the overall formulation of the supplement.

Generally, it is known that gels formed in molasses and molasses-based supplements comprise several mineral phosphates or sulfates, especially of calcium, iron and magnesium, together with polysaccharide gums from the molasses. Since the ash content of some molasses may be as high as about 12 percent and the molasses content of a finished supplement may contain as much as 70 percent molasses, excessive thickening or gelling may occur upon the addition of soluble phosphorous or sulfur sources, both of which are usually incorporated in nutritionally-balanced supplements. Such problems are usually aggravated by the uncontrolled addition of calcium chloride, which also usually causes formation of undesired precipitates. Gelling of the supplements and precipitation of phosphate and sulfate complexes is encountered where calcium chloride is added to the supplement prior to the addition of the sulfur and/or phosphorous source (the maximum amount of elemental sulfur and phosphorus each usually being about 2 percent by weight), particularly where the amount of elemental calcium incorporated is about 2 percent or more and where the amounts of sulfur or phosphorous are from about 1 to about 2 percent. Ordinarily, from about 2 to about 6 percent calcium is desirably incorporated into such supplements to satisfy nutritional requirements.

Surprisingly, it was discovered that the foregoing problems were obviated and highly stable and fluid liquid feed supplements obtained by incorporating solid calcium chloride after sulfur and phosphorous additions. Such supplements are found to be fluid and homogenous at temperatures ranging from about −20° to about 110°F. for periods of up to about 2 months.

The water soluble phosphorous source can be any of the phosphorous compounds which herebefore have been used in liquid feed supplements, including phosphoric acid, sodium tripolyphosphate, diammonium phosphate, ammonium polyphosphate, calcium phosphate and the like. In practicing the present invention, however, it is preferred to employ an ammonium polyphosphate. It will also be understood that the phosphorous compound should be incorporated in the supplement on the basis of phosphorous requirement. According to the present invention, the ammonium polyphosphate or other phosphorous source, such as phosphoric acid or sodium tripolyphosphate, can be prepared and stored as aqueous solution for incorporation in the feed supplement.

The solid calcium chloride employed in the method of the present invention can be anhydrous or hydrated, but should be calculated on a dry basis. It is preferable to provide good agitation of the supplement during the addition of the calcium chloride; otherwise, localized thickening and gelling may occur upon the initial addition of calcium chloride. Non-protein nitrogen sources such as urea, in solid or liquid form, are also usually incorporated into balanced liquid feed supplements.

Typically, the molasses or carbohydrate source will comprise from about 30 to about 70% by weight on a solids basis of the total liquid feed supplement. Ordinarily, the carbohydrate source comprises from about 30 to about 60% by weight of the supplement. Such supplements also usually contain from 0.2 to about 2% by weight of phosphorous, which can be added as ammonium polyphosphate or other phosphorous source. The supplement can also contain from about 0.5 to about 6% by weight of calcium, supplied as calcium chloride. Preferably, such supplements contain from about 2.0 to about 5.0% by weight calcium (elemental basis). Ordinarily, a calcium/phosphorous ratio (on an elemental basis) of from about 2:1 to about 6:1 is employed. The non-protein nitrogen sources usually comprise from about 15 to about 35% by weight of the supplement while sulfur, where employed, is used in amounts ranging from about 0.5 to about 2% by weight (elemental basis). The total water content of the finished supplement can range from about 5 to about 25%, preferably from about 7 to about 18%. Other trace minerals, salt, vitamins, antibiotics and the like can also be incorporated in such liquid feed supplements in proportions well known to those skilled in the art.

The following examples illustrate in greater detail the preparation of typical feed supplements by the method of the present invention.

EXAMPLE 1

The effect of calcium chloride on the properties of liquid feed supplements containing a phosphorous source was evaluated by varying the order of calcium chloride addition to said supplements. The ingredients and order of ingredient addition are set forth in the following Table I.

Table I

| Ingredients | Addition Order A | B | C |
|---|---|---|---|
| Cane molasses 56.74 | 1 | 1 | 1 |
| Urea solution 23.60 | 2 soln | 3 soln | 2 solid |
| *Calcium chloride 17.80 | 2 | 3 | 4 |
| **H$_3$PO$_4$ 1.86 | 3 | 2 | 3 |

*5% calcium
**0.5% phosphorous

The ingredients were mixed with good agitation and the prepared compositions were stored for seven days at a temperature of 105°F. and then examined. Compositions A and B (where the calcium chloride was premixed with the urea solution) were each found to have formed hard gels and to contain both a gelatinous and crystalline precipitate. Composition C was found to be very fluid and homogenous with no layering or sedimentation. The results of such evaluations indicate that, in order to obtain desirable fluid and homogeneous liquid feed supplements, the calcium chloride ingredient must be added separately as a solid and after the addition of the phosphorous source to the supplement. Compositions having the characteristics of Composition C were similarly obtained employing other phosphorous and sulfur derivatives, other additives, and from about 1 to about 5% calcium.

EXAMPLE 2

The following liquid feed supplements were prepared and evaluated.

Table II

| Ingredient | Addition Order | Supplement A | B | C |
|---|---|---|---|---|
| | | Weight Percent | | |
| Cane molasses | 1 | 54.9 | 59.0 | 44.2 |
| 50% urea solution | 2 | 23.5 | 23.6 | 23.5 |
| Calcium chloride (%Ca) | 2 | — | 10.7(3) | 10.7(3) |
| *A.P.P. 10-34-0 (%P) | 4 | 12.8(2) | — | 12.8(2) |
| NaCl | 2 | 3.0 | 3.0 | 3.0 |
| (NH$_4$)$_2$SO$_4$ | 3 | 1.8 | 1.5 | 1.8 |
| Water | 3 | 4.0 | 2.2 | 4.0 |

*Ammonium polyphosphate

Supplement A, which contained no calcium, and Supplement B, which contained no phosphorous, were evaluated as set forth in Example 1 and were found to be fluid and homogenous. Supplement C, wherein the calcium source was added to the supplement prior to the addition of the phosphorous source, was found to be non-flowing and to contain gelatinous particles in suspension.

EXAMPLE 3

The preparation of the composition of a complete and balanced supplement with 45% crude protein equivalent and containing 3% calcium and 1.1% phosphorous is shown in the following Table III.

Table III

| Formulation | Wt. % | Order of Addition |
|---|---|---|
| Cane molasses | 32.5 | 1 |
| Grain fermentation solubles | 6.0 | 1 |
| Animal fat | 2.5 | 1 |
| Urea solution | 27.5 | 2 |
| NaCl | 7.5 | 2 |
| Water | 4.0 | 2 |
| (NH$_4$)$_2$SO$_4$ | 1.8 | 2 |
| *A.P.P. (10-34-0) | 7.0 | 3 |
| **Calcium chloride | 10.7 | 4 |
| Trace minerals | 0.4 | 5 |
| Vitamins | 0.1 | 6 |
| | 100 | |

*Ammonium polyphosphate
**DOWFLAKE, available from The Dow Chemical Company

The above prepared supplement was fluid and homogeneous and showed no tendency to deposit sediment either upon standing for a period of about 5 days or when subjected to a mechanical, horizontal shaking. The prepared supplement was then centrifuged at 5,000 rpm to induce separation of layers which were then subjected to x-ray analysis in order to determine the nature of the reaction between the phosphorous and calcium ions in the supplement. Analysis of the three layers obtained (e.g., fat, liquid and paste layers) indicated that most of the phosphorous had reacted with the available calcium ions to form a non-crystalline compound, the ignition residue of which was determined to be calcium pyrophosphate.

Various changes and modifications of the invention can be made and to the extent that such variations incorporate the spirit of this invention they are intended to be within the scope of the appended claims.

What is claimed is:

1. In a method for preparing a liquid animal feed supplement substantially without occurrence of gelling or sedimentation, which supplement comprises water, soluble carbohydrate sources, at least one soluble elemental source selected from the group consisting of sources containing at least one of at least about 0.2% by weight of phosphorous and at least about 0.5% by weight of sulfur, and at least about 0.5% by weight of calcium as calcium chloride, and which supplement would contain at least one of gelled material and sedimentation upon the said calcium chloride content being incorporated thereinto as an aqueous solution, the improved sequence of steps comprising: A) first mixing said soluble elemental source with said carbohydrate source and water, and B) thereafter incorporating, with agitation, solid calcium chloride into the mixture of Step A to provide said calcium chloride in solution.

2. The method according to claim 1 including the step of incorporating in said liquid feed supplement a non-protein nitrogen source.

3. The method according to claim 1 wherein said liquid feed supplement contains from 0.5 to about 6% calcium as calcium chloride.

4. The method according to claim 2 wherein said completed supplement contains by weight from about 30 to about 70% molasses, (solids basis), from about 15 to about 50% non-protein nitrogen source, from about 0.5 to about 6% calcium as calcium chloride, from about 0.2 to 2% elemental phosphorous, and from about 5 to 25% total water.

5. The method as in claim 4 wherein the completed supplement contains, by weight, at least about 2% calcium and at least about 1% of at least one of phosphorous and sulfur present as soluble elemental source.

6. The method as in claim 4 wherein the completed supplement contains, by weight, at least about 2 to 6% Ca and from about 1 to 2% of at least one of phosphorous and sulfur present as soluble elemental source.

* * * * *